Figure 1:
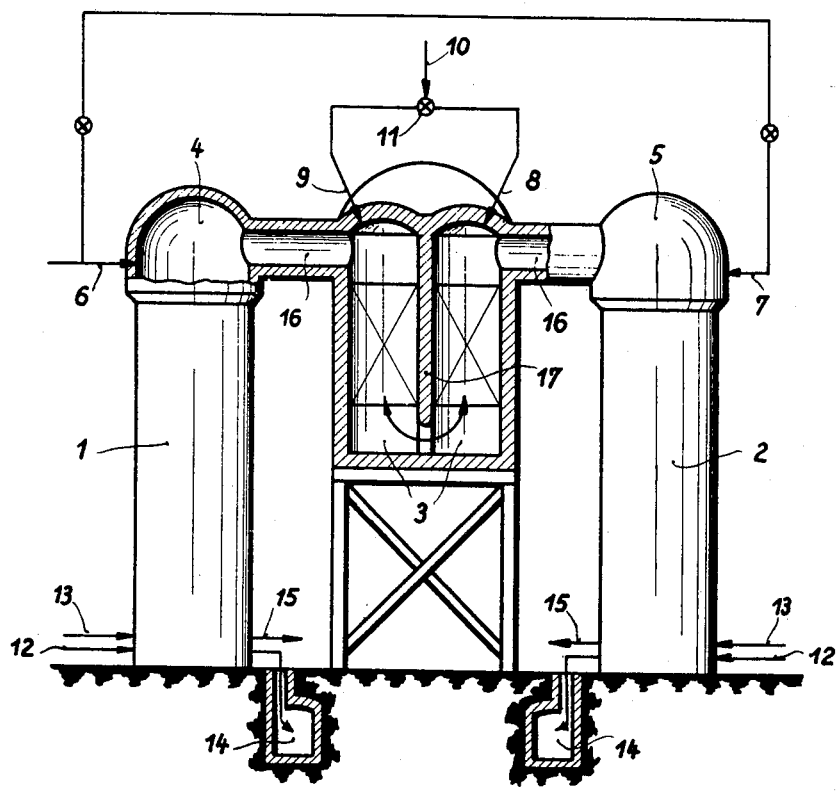

Feb. 14, 1956    F. TOTZEK ET AL    2,734,811
METHOD FOR THE PRODUCTION OF FUEL GAS FROM LIQUID FUELS
Filed March 14, 1951    2 Sheets-Sheet 2

Inventors:
Friedrich Totzek
Willy Linder
By Thomas J. P. O'Brien
atty

United States Patent Office 2,734,811
Patented Feb. 14, 1956

2,734,811
METHOD FOR THE PRODUCTION OF FUEL GAS FROM LIQUID FUELS

Friedrich Totzek and Willy Linder, Essen, Germany, assignors, by mesne assignments, to Koppers Company, Inc., Pittsburgh, Pa., a corporation of Delaware Application March 14, 1951, Serial No. 215,554

1 Claim. (Cl. 48—214)

This invention relates to the production of combustible gases—particularly gases of high calorific value, which can also be used as town gas, or of water gas with a high content of carbon monoxide and hydrogen for use in the synthesis hydrocarbons or the like—by the destructive conversion of liquid fuels, for example mineral oil or mineral oil distillates or residues, tar or tar distillates and the like.

It is known to produce combustible gases for example from lignite tar oils for example by bringing the hydrocarbon oil, in a state of fine division, such as by spraying it under pressure from a nozzle, into contact with hot refractory bodies (chequer work). The hydrocarbon oil is thus subjected to a pyrogeneous decomposition through which permanent gases are formed. This known process has the advantage that it provides a gas of very high calorific value (8000 kcal./Nm.$^3$ or higher). Its disadvantage lies in that a very high proportion of the original fuel, about 45%, is produced in the form of high molecular hydrocarbons (tar and pitch) as well as benzene together with a considerable quantity of elementary carbon. The yield of gas in this process is thus relatively small and only about 0.6 Nm.$^3$ gas is produced per kg. of the original liquid fuel.

The production of combustible gases from liquid fuels by the so-called carburetting of water gas is also known. In this process the decomposition of the hydrocarbon oil also takes place on hot wall surfaces, but in the presence of steam. As a result of this the yield of gas is considerably increased, and the formation of tarry residues correspondingly reduced, so that about 70%–75% of the original liquid fuel is converted into combustible gas. In this way there is obtained a mixture of water gas and decomposition gas, the calorific value of which varies between 2500 and 3700 kcal./m.$^3$, according to the quantity of the liquid fuel treated and the kind of reaction which is carried out.

A further technical advance resulted from carrying out the decomposition of the liquid fuel in the presence of preheated water vapour, which was obtained in regenerative heat accumulators, the reaction temperature being so far increased by the simultaneous addition of a definite quantity of air that the elementary carbon separating out was completely converted into gaseous constituents, partly by reaction with the oxygen and partly by reaction with the preheated water vapour. In this way about 85% to 90% of the initial liquid fuel could be converted into gas, but the resulting useful gas contained a considerable quantity of nitrogen so that in practice it could only be considered for certain heating purposes.

The present invention solves the problem of obtaining from liquid fuels a combustible gas of high calorific value which is practically free of nitrogen, according to the following principles:

In order to convert the liquid fuel into gas the invention employs a regenerator system of a known kind, operating with an alternating direction of flow, and having two heat accumulators for alternately preheating the reaction media (steam or the like) and a reaction chamber arranged therebetween in which the preheated reaction media and the fuel to be gasified are introduced.

According to the invention still further heat is supplied to the mixture from the supplied fuel and the regeneratively preheated reaction media after the formation of the mixture so that the temperature of the mixture is further increased and brought to a degree which is necessary for the complete or approximately complete execution of the desired converting reactions.

This supply of heat to the preheated mixture may be carried out in various ways according to the invention.

Firstly it is possible to provide between the two regenerators which serve to preheat the reaction media, now called: preheating regenerators, a further regenerator system to which upon heating up, heat is supplied independently of the two preheating regenerators, so that the working temperature of the middle regenerator system (now called: reaction heat regenerators) lies substantially higher.

Another important embodiment of the invention consists in admixing with the preheated mixture in the reaction chamber, or upon entry into the same, hot combustion gases which may be produced by the reaction with oxygen or air, in an exothermic reaction, of a part of the combustible substance contained in the mixture, which is directly injected into the reaction chamber or which flows, together with the steam or other reaction materials through the preheating regenerators. This embodiment of the invention gives the advantage that the reaction heat regenerator system between the preheating regenerators can be omitted and some cases the preheating regenerators can be made considerably smaller.

The latter embodiment of the invention can also be carried into effect by passing a part of the fuel to be reacted, together with reaction materials, through the preheating regenerator and in this way bringing it to such a high temperature that the oxygen entering the reaction chamber at high temperature can burn with the preheated fuel.

A preferred way of carrying into effect this latter feature of the invention consists in introducing through the preheating regenerators, in addition to the media of the endothermic reaction (steam or the like) so much oxygen with one part of the fuel to be treated, that the composition of the mixture of oxygen and fuel is below or above the explosion limit, whilst the remainder of the fuel, together with the rest of the quantity of oxygen necessary for the desired increase of temperature in the reaction chamber, enters the reaction chamber. The essential advantage of this method of operation consists in that best mixing of the components of the mixture is assured before the beginning of the reactions and unfavourably high local concentrations of hydrocarbons from which in some conditions elementary carbon (soot) may result, are avoided.

With a double regenerator system, it is advantageous, after the cooling of that preheating regenerator in which the steam was preheated in a certain operating period, and without change of the direction of flow, to introduce, according to the invention, air instead of steam through the preheating regenerator and to burn the preheated air, in a combustion chamber arranged between the preheating regenerator and the adjoining reaction heat regenerator, with a portion of the liquid fuel, whereon hot combustion gases are passed through the regenerator system until the other part thereof has attained the temperature necessary for the heating of the reaction media and the direction of flow in the regenerator system can be changed and steam re-introduced.

In the employment of the process according to the invention a very high yield of gas is produced, as only about 3% to 6% of tarry constituents result from the initial fuel or remain non-decomposed. This high yield of gas is due to the fact that the reaction chamber or regenerator in which the finely divided liquid fuel comes into contact with pre-heated steam, is kept at a high temperature which ensures a practically complete conversion, as far as the residue stated, without substantial formation of elementary carbon.

In the drawing Fig. 1 shows partly in elevation and partly in vertical section a plant suitable for carrying out the process according to the invention.

Figure 2:
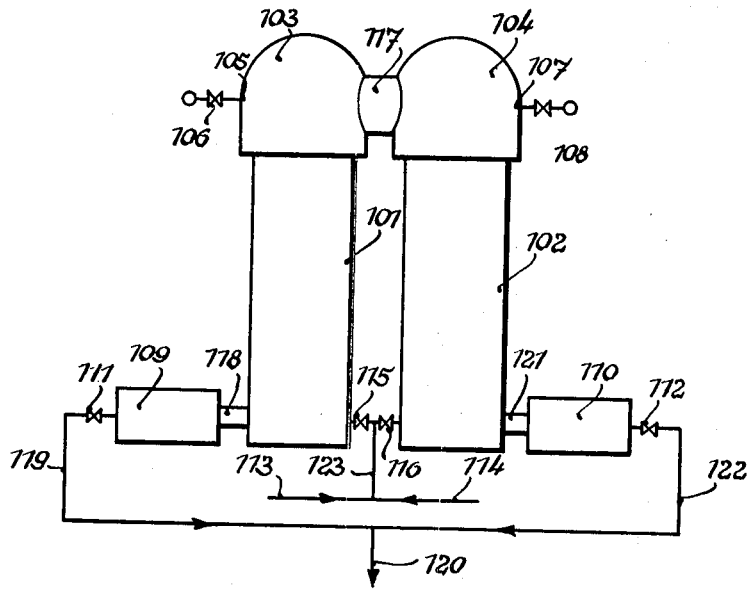

Fig. 2 shows diagrammatically another form of construction of a plant suitable for the process according to the invention.

The apparatus according to Fig. 1 consists of the two pre-heating regenerators 1, 2 and the reaction heat regenerator 3. At the upper ends or in the cupola of each of each of the pre-heating regenerators 1 and 2 there is provided a combustion chamber 4, 5 in which liquid fuel at high pressure can be injected by means of a nozzle in such a way that the fuel is finely divided in the combustion chambers.

From each of the combustion chambers 4 and 5 a pipe 16 leads into the reaction heat regenerator 3 which is subdivided by an intermediate wall 17 into a rising and a descending branch. On the cover of the reaction heat regenerator 3 there are provided at 8 and 9 injection nozzles or the like for liquid fuel which is fed from the pipe 10 through a reversing valve 11.

It will now be assumed that the preheating regenerator 1 has been heated to a high temperature in a preceding operating period, and likewise the reaction heat regenerator 3. Steam is then introduced into the preheating regenerator 1 through the pipe 12 at the bottom and is heated, during its upward flow, by the hot chequer-work of the preheating regenerator 1 and finally comes into contact in the left dome chamber of the reaction heat regenerator 3 with the liquid fuel injected through the nozzle 9. In the reaction heat regenerator a very high temperature is created—e. g. about 1250° with the production of water gas practically free from hydrocarbon and for example 1050° with the production of town gas with a calorific value of 4000 kcal./m.$^3$.

At this high temperature the hydrocarbon oil is converted completely into gaseous constituents with only a small residue. This reaction takes place substantially in all zones of the heat regenerator 3.

The reaction media then pass through the pipe 16 into the right preheating regenerator 2 which was cooled in a preceding operating period and which now receives and stores the sensible heat from the reaction media in this operating period. The useful gas is withdrawn at 15 from the preheating regenerator 2.

As soon as the temperature of the steam preheated in the preheating regenerator 1 or the temperature in the reaction heat regenerator 3 has dropped to such an extent that an extensive decomposition of the hydrocarbon oil can no longer take place, the supply of hydrocarbon oil at 10 and the supply of steam at 12 are interrupted. Air is then introduced through the pipe 13 into the preheating regenerator 1 and simultaneously some liquid fuel is injected through the nozzle 6 into the coupling chamber 4. The liquid fuel burns with the hot air flowing into the dome chamber 4. The resulting waste gases of very high temperature are passed through the reaction heat regenerator 3 and are then drawn off through the pre-heating regenerator 2 into the flue 14. By this means the reaction heat regenerator 3 is again brought to the desired high temperature and simultaneously as much heat is supplied to the chequer work of the pre-heating regenerator 2 as is necessary to pre-heat the reaction steam in the next operating period.

After the desired temperatures in the regenerators 2 and 3 have been attained the regenerator system is reversed. Now steam is first of all introduced into the preheating accumulator 2 and liquid fuel is sprayed into the right hand dome chamber of the reaction heat regenerator 3 through the nozzle 8. The resulting useful gas gives up its sensible heat to the preheating regenerator 1 and is withdrawn from it at 15. As soon as the temperature in the preheating regenerator 2 and 3 has fallen too much the supply of steam into the preheating regenerator 2 and the injection of fuel through the nozzle 8 is cut off and, as previously described in relation to preheating regenerator 1, combustion is created in the dome chamber 5 of the preheating regenerator 2.

In special cases it is possible to introduce, during the introduction of steam, a quantity of air, pure oxygen or air of increased oxygen content, either together with the steam into the preheating regenerator 1 or 2 or alone with a certain quantity of oil through the nozzles 6 or 7. By this means a further favourable increase of the temperature in the reaction heat regenerator 3 is obtained. The introduction of oxygen with or without liquid fuel has in addition the advantage that the change-over periods of the regenerator system can be extended, and in some cases the whole system may even be continuously operated, according to the desired composition of the useful gas.

The apparatus illustrated in Fig. 2, for carrying into effect another embodiment of the invention comprises the two tower-like regenerators 101, 102 which are provided in the known manner with a refractory chequer-work or the like serving to store the heat. The chequers of the regenerators extend upwards into the free dome chamber 103, 104, which are connected with each other through a further pipe 117.

One or more nozzle-like inlets 105 open into the dome chamber 103 and nozzle-like inlets 107 into the dome chamber 104. The inlet openings 105 and 107 are constructed so that, for example a liquid fuel, such as a high boiling point mineral oil residue can be forced at high pressure through the nozzles and thus forms a mist of fine droplets within the dome chambers 103, 104. The cut-off and adjusting members 106, 108 serve to control the stream of liquid through the nozzles 105, 107.

At the lower end of the regenerator 101 is connected the useful gas pipe 118 to which is connected a steam boiler 109 from which the cooled useful gas can flow through the pipe 119, controlled by a cut-off valve 111, to the useful gas collecting pipe 120.

In a similar manner the regenerator 102 is connected through the pipe 121 with the steam boiler 110 and the pipe 122, controlled by the valve 112, with the useful gas collecting pipe 120.

In addition, the supply pipe 123 for the gasification media, controlled by the cut off members 115, 116 open into the lower ends of the regenerators 101, 102. The pipe 123 is supplied with steam from the pipe 113 and oxygen from the pipe 114 in regulable quantities.

It will be assumed that the regenerator 101 is preheated to that temperature which is necessary for the desired preheating of the gasification media.

In this operating condition the cut-off valve 111 is closed and the cut-off valve 112 is open. Moreover, the cut-off valve 115 in the pipe for the gasification media is open and the cut-off valve 116 closed. The cold gasification media now flow in at the base of the regenerator 101 and rise upwards therein whilst being heated by contact with the preheated chequers. After suitable adjustment of the regulating member 106 liquid fuel is now sprayed into the dome chamber 103 through the nozzle opening 105. The fuel reacts with the gasification media. The hot reaction products flow downwards into the regenerator 102 and there give up a part of their sensible heat to the chequers of the regenerator 102. A further cooling of the useful gas takes place in the steam boiler 110. The cooled useful gas then goes through the pipe 122 into the useful gas collecting pipe 120 for further treatment and use.

When the temperature in the regenerator 101 has dropped below the value necessary for the preheating of the gasification media the cut-off valve 115 and 112 and the fuel valve 106 are closed in the appropriate sequence. The cut off valves 111 and 116 and the fuel valve 108 are then opened in a corresponding sequence so that the gasification media are now heated in the regenerator 102 and the hot reaction products give up their sensible heat in the regenerator 111 and steam boiler 109.

After the regenerator 102 has been cooled down the corresponding process is repeated by reversing, whereupon the regenerator 101 serves once again to preheat the gasification media.

In the apparatus illustrated there is treated for example a gaseous fuel which may be the residual gas from an oil refinery and consists substantially of gaseous hydrocarbons of the methane, ethane, propane and butane series. This gas has a net calorific value of 17,800 kal. per $Nm.^3$. 1.5 $m.^3$ of oxygen (95%) and 1.05 kg. of steam were used per $Nm.^3$ of this residual gas. A useful gas of the following composition was formed:

| | Percent |
|---|---|
| $CO_2$ | 4.2 |
| CO | 36.7 |
| $H_2$ | 56.9 |
| $N_2$ | 1.3 |
| $CH_4$ | 0.6 |
| $C_nH_n$ | 0.2 |
| $H_2S$ | 0.1 | whilst about 5.75 $Nm.^3$ of this water gas was produced from 1 $Nm.^3$ of the starting gas. The reaction temperature in the dome chambers 103, 104 amounted to about 1300–1400°, whilst the gasification media in the regenerators 101 and 102 were preheated to about 1000°.

In the scope of the present invention oxygen is to be understood as including pure oxygen as well as air of increased oxygen content. It is preferable to employ an oxygenated gas containing about 85–95% of $O_2$.

If the plant shown in Fig. 2 is used in order during the preheating of the endothermically reacting media (steam or the like) to conduct a gaseous or vapourous fuel (hydrocarbon) with the reaction media through the preheating regenerators, and in some cases together with a proportion of oxygen or air, the inlet openings controlled by the cut-off members 115, 116 may be used with advantage in order to introduce these additional substances into the regenerators in the known manner. The valves 115, 116 are for the purpose connected with corresponding pipes through which the media in question are supplied.

Having now described the principles of our invention and in what manner the same is to be performed we declare that the invention should not be limited to the given examples but that it is to be claimed for all forms of realisation within the scope of the following claim.

What we claim is:

A continuous process for endothermically reacting a hydrocarbon with steam to produce combustible gases comprising passing a gas consisting essentially of steam only through a first regenerator which is progressively hotter in the direction of gas flow and thereafter admixing the heated steam with said hydrocarbon, endothermically reacting the resulting mixture of steam and hydrocarbon in a reaction zone and thereafter cooling the hot endothermic reaction products by passage through a second regenerator which is progressively colder in the direction of gas flow, supplying all of the heat required to complete the preheating and to endothermically react said mixture of steam and hydrocarbon by burning in said reaction zone with a free oxygen-containing gas, simultaneously during said endothermic reaction, a portion but not all of the hydrocarbon contained in said mixture, the hot products of combustion resulting from said burning being cooled by passage, in admixture with said endothermic reaction products, through said second regenerator, periodically reversing the direction of gas flow through said regenerators and reaction zone so that the heat transferred to and stored in said second regenerator during cooling of said endothermic reaction products and said combustion products by passage of the same therethrough, when gas flow is in one direction, is extracted therefrom to preheat said mixture of steam and hydrocarbon by passage of said steam therethrough when gas flow is in the opposite direction, wherein said steam and hydrocarbon can be endothermically reacted continuously to produce combustible gases without requiring a separate, alternating heating step.

References Cited in the file of this patent

UNITED STATES PATENTS

| | | |
|---|---|---|
| 1,770,563 | Wannebo | July 15, 1930 |
| 1,874,801 | Porter | Aug. 30, 1932 |
| 1,891,446 | Reichhelm | Dec. 20, 1932 |
| 2,135,693 | Barwell et al. | Nov. 8, 1938 |
| 2,192,815 | Johnson et al. | Mar. 5, 1940 |
| 2,313,157 | Linder | Mar. 9, 1943 |
| 2,605,176 | Pearson | July 29, 1952 |

FOREIGN PATENTS

| | | |
|---|---|---|
| 390,849 | Great Britain | Apr. 5, 1933 |